(12) United States Patent
Neag

(10) Patent No.: US 6,312,008 B1
(45) Date of Patent: Nov. 6, 2001

(54) AIRBAG SYSTEM WITH ENERGY ABSORPTION BRACKET

(75) Inventor: Dorinel Neag, Walled Lake, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/502,891

(22) Filed: Feb. 11, 2000

(51) Int. Cl.[7] ................................................ B60R 21/16
(52) U.S. Cl. ............................. 280/728.2; 280/730.2; 280/751
(58) Field of Search .................... 280/728.1, 728.2, 280/730.2, 731, 732, 743.1, 751, 752

(56) References Cited

U.S. PATENT DOCUMENTS

| | | |
|---|---|---|
| 2,834,606 | 5/1958 | Bertrand . |
| 4,966,388 | 10/1990 | Warner et al. . |
| 5,265,903 | 11/1993 | Kuretake et al. . |
| 5,333,898 | 8/1994 | Stutz . |
| 5,333,899 | 8/1994 | Witte . |
| 5,362,097 | 11/1994 | Barske . |
| 5,470,103 | 11/1995 | Vaillancourt et al. . |
| 5,540,459 | 7/1996 | Daniel . |
| 5,588,672 | 12/1996 | Karlow et al. . |
| 5,639,116 * | 6/1997 | Shimizu et al. ................ 280/728.1 |
| 5,791,683 | 8/1998 | Shibata et al. . |
| 5,803,487 * | 9/1998 | Kikuchi et al. ................ 280/732 |
| 5,820,159 * | 10/1998 | Werner et al. .................. 280/728.2 |
| 5,890,733 | 4/1999 | Dillon . |
| 5,921,576 | 7/1999 | Sinnhuber . |
| 5,947,630 * | 9/1999 | Dillon ............................. 280/728.2 |
| 6,079,732 * | 6/2000 | Nakajima et al. ............. 280/728.1 |
| 6,142,506 * | 11/2000 | Patal et al. .................... 296/189 |
| 6,173,990 * | 1/2001 | Nakajima et al. ............. 280/730.2 |
| 6,179,324 * | 1/2001 | White, Jr. et al. ............ 280/730.2 |

* cited by examiner

Primary Examiner—J. J. Swann
Assistant Examiner—Christopher Bottorff
(74) Attorney, Agent, or Firm—Edwin W. Bacon, Jr.

(57) ABSTRACT

An air bag system that includes an energy absorption bracket attaching the air bag to the vehicle body is provided. The energy absorption bracket includes a generally planar surface for attachment of the air bag module thereto. The bracket also includes at least two downstanding legs that interconnect the generally planar surface and the vehicle body. By use of these downstanding legs the bracket forms a space between the air bag and the vehicle body whereby if an object strikes the air bag, the bracket with deform and collapse into said space thereby, absorbing the impact energy from the object.

3 Claims, 4 Drawing Sheets

AIRBAG SYSTEM WITH ENERGY ABSORPTION BRACKET

BACKGROUND OF THE INVENTION

1. Technical Field

The present invention relates in general to motor vehicle safety systems. More particularly, the present invention relates to an airbag apparatus for motor vehicles. More specifically, but without restriction to the particular embodiment and/or use which is shown and described for purposes of illustration, the present invention relates to an airbag apparatus that includes an impact absorbing mechanism.

2. Discussion

Automobiles have incorporated many safety systems into their design over the years to help protect the occupants during various types of collisions. The seatbelt, which keeps occupants securely fastened to their seat, was and arguably still is the most prevalent safety device in the industry.

In recent years, both the government and the automotive industry realized the advantages that an inflatable occupant restraint system or airbag system could provide. The drive to develop and implement such a system was so strong that within just a few years almost all vehicles included inflatable occupant restraints that protected occupants during frontal collisions. Soon after the introduction of these frontal airbags, the industry began looking for ways and methods of protection during side collisions.

One intuitive response was to incorporate inflatable restraints to enhance the protection of the occupants during a collision from the lateral side of a vehicle. These inflatable restraints for lateral or side collisions have been placed in a number of locations within the vehicle. For example, some vehicles have airbags placed in the side of the vehicle seat whereby during a collision the airbag deploys from the side of the seat and forms against the lateral side of the vehicle interior. Other vehicles have placed airbags in the doors that protect during side collisions. Sometimes, due to packaging constraints, it is preferable to place an airbag in either a pillar or over the door header as disclosed in U.S. Pat. No. 5,791,683 assigned to Toyota Gisei Company Limited. Unfortunately, this leads to a number of problems. Most specifically, vehicle regulations in the United States now require that portions of the vehicle interior above the belt line of the occupants have specific energy absorbing characteristics. This requirement FMVSS 201 has lead automotive companies to place impact countermeasures behind headliners and trim pieces in order to satisfy this energy absorbing requirements. Countermeasures include, but are not limited to, energy absorbing foam and crushable plastic ribs that act to absorb impact energy.

It is obviously desirable to have a clear, appointed path for any airbag. This is typically employed by the use of the deployment door that is hinged on one end and is moved out of the way by the force of the airbag. This is the standard practice for frontal airbags disposed within the steering wheel, the instrument panel of the vehicle, and a vehicle door. This standard practice becomes more difficult when airbags are disposed in a pillar over the door header. The '683 patent includes such an airbag and disclosures a garnished trim that opens to allow deployment of the airbag. U.S. Pat. No. 5,540,459 assigned to Ford Motor Company describes another arrangement for a side airbag disposed above the door header. In the '459 patent, the airbag deployment forces the headliner inboard so that the airbag can deploy along the lateral side of the vehicle. Although the arrangements that are disclosed in patents '459 and '683 perform satisfactorily, neither includes impact counter measures in their design. The traditional impact countermeasures have been foam and plastic ribs disposed beneath a decorative cover. However, with the addition of these impact counter measures, like ribs of foam, this becomes much more difficult to provide a clear path for airbag deployment. It is therefore desirable to have an airbag system with impact counter measures that allows for deployment of an airbag in a controlled and predetermined direction.

SUMMARY OF THE INVENTION

Accordingly, it is the principal objective of the present invention to provide an bag system that includes impact countermeasures, the air bag being employed to protect occupants during certain types of collisions and the impact countermeasures design to absorb energy during impacts therewith.

It is another objective of the present invention to provide an energy absorption bracket disposed within an air bag module that will not adversely affect the deployment of the airbag.

In one form, the present invention concerns an air bag that is attached to a vehicle body via an energy absorption bracket. The energy absorption bracket includes a generally planar surface for attachment of the air bag module thereto. The bracket also includes at least two downstanding legs that interconnect the generally planar surface and the vehicle body. By use of these downstanding legs the bracket forms a space between the air bag and the vehicle body so that if an object strikes the air bag, the bracket with deform and collapse into said space thereby, absorbing the impact energy from the object.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

The drawings, which form an integral part of the specification, are to be written in conjunction therewith, and like reference numerals are employed to designate identical components in various views.

DETAILED DESCRIPTION OF THE PREFERRED EMBODIMENT

An apparatus comprising an air bag system with an energy absorption bracket is provided. In the following description, numerous specific details are set forth in order to provide a more comprehensive description of the present invention. It will be apparent, however, to one skilled in the art, that the present invention may be practiced without these specific details. In other instances, specific details of well-known features have not been described so as not to obscure the present invention.

Figure 1:
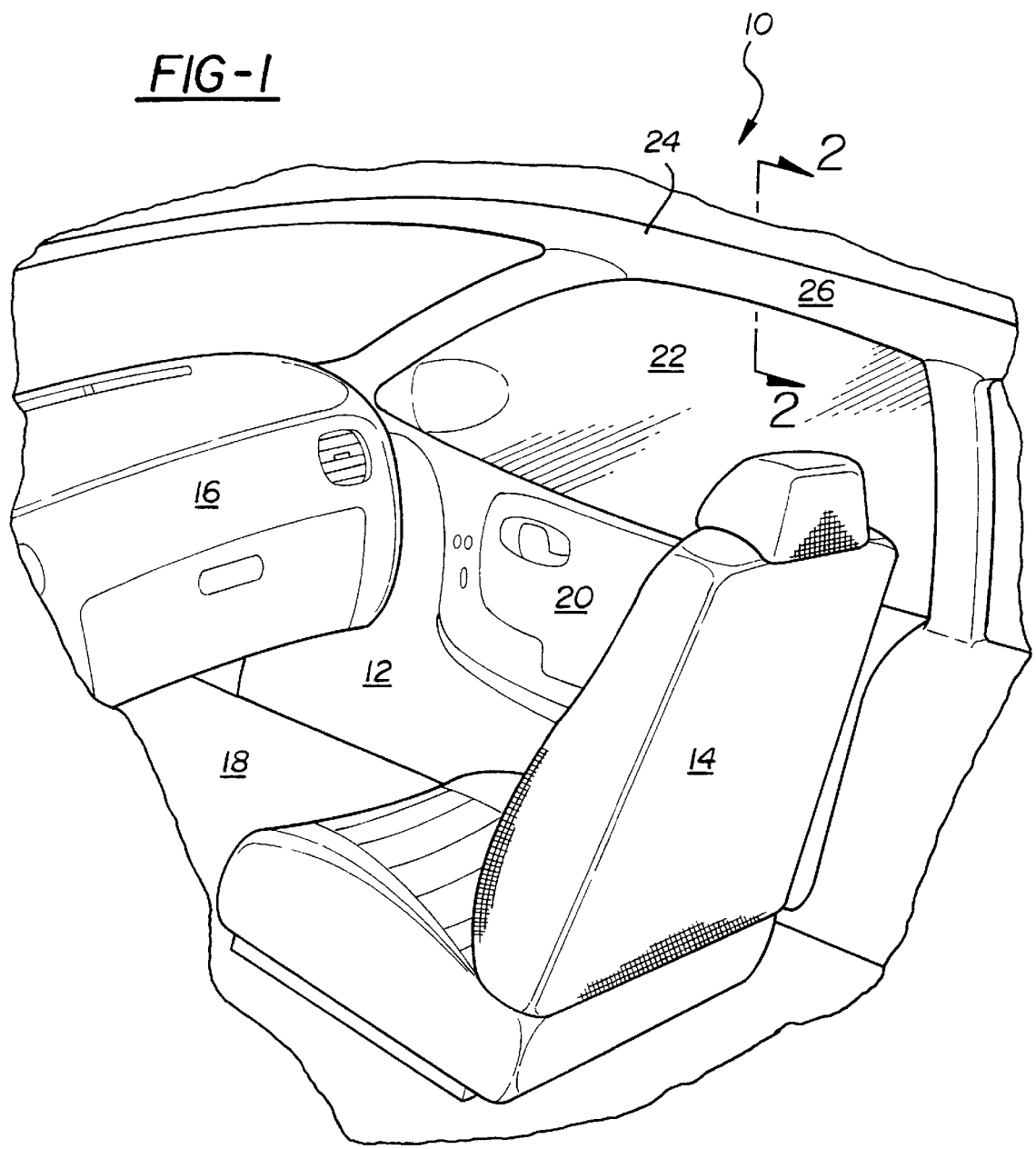
FIG. 1 is a perspective view of a vehicle interior showing the passenger side, front seat and associated windows and headliner.

Referring now to the drawings, FIG. 1 illustrates a perspective view of a vehicle 10, which includes the airbag system and energy absorption bracket of the present invention. Vehicle 10 includes an interior 12, which includes among other things, a front passenger seat 14 and instrument panel 16 disposed forward thereof. Vehicle interior 10 also includes a vehicle floor 18 that defines the lowermost boundaries of the vehicle interior 12. The lateral boundaries of the vehicle interior 12 are formed by a front vehicle door 20 and a front vehicle window 22 that extends upward from vehicle door 20 and can be reversibly translated in a vertical manner. Vehicle interior 12 is bounded on the upwardmost surface by headliner 24 which extends substantially from vehicle window 22 on the right side of the vehicle to the vehicle window (not shown) on left side of the vehicle. It should be appreciated that the left and right sides of the vehicle are substantially identical for purposes of this disclosure. Therefore, only the right side will be described and illustrated in detail. Headliner 24 includes a header portion 26, which extends in a longitudinal manner and is disposed vertically above front window 22.

Figure 2:
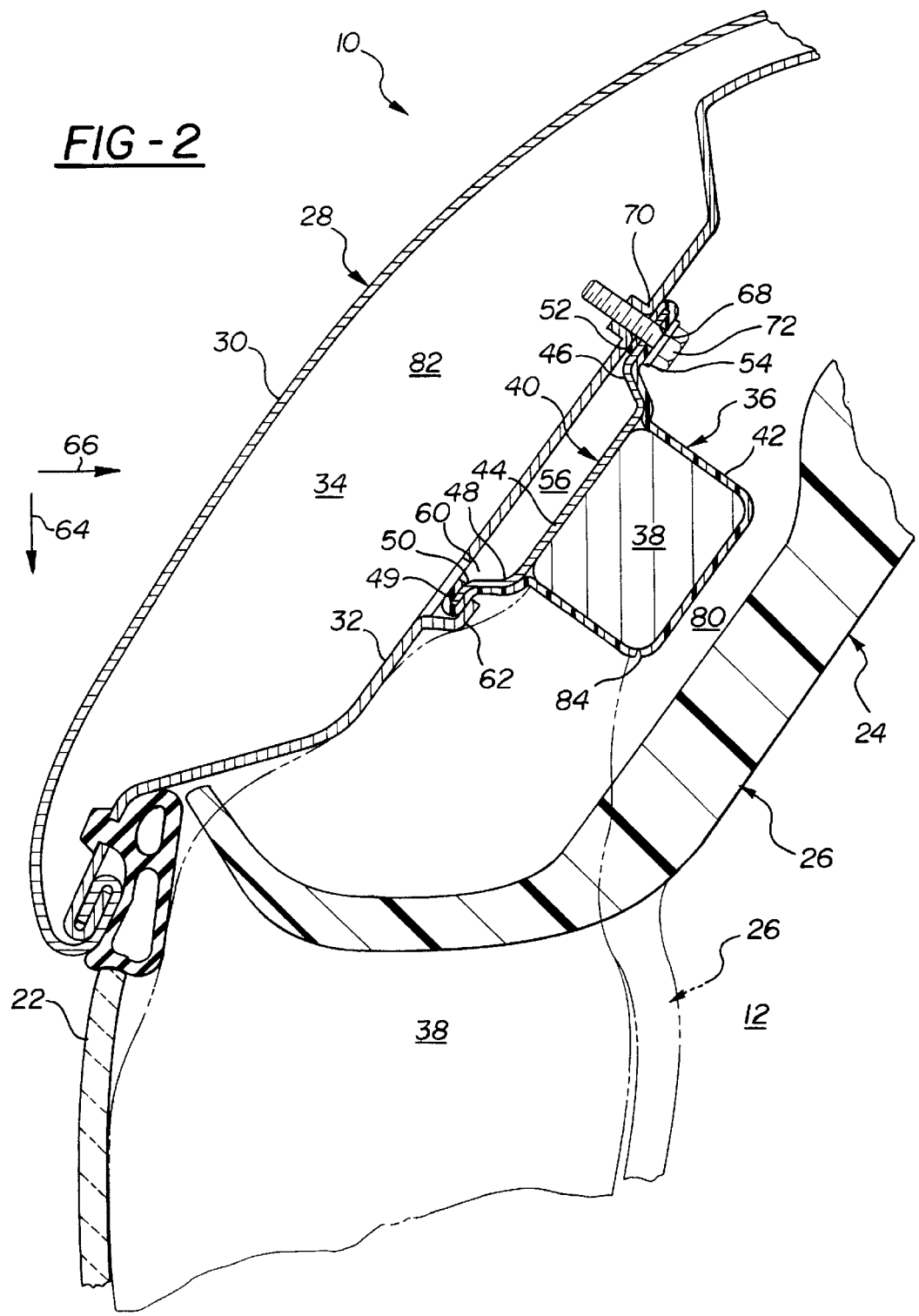
FIG. 2 is a cross-sectional view of the preferred embodiment of the present invention along the line 2—2 of FIG. 1, with a deployed air bag and corresponding movement of the headliner shown in phantom.

Turning to FIG. 2, a cross-sectional view of the preferred embodiment of the present invention is illustrated, wherein the header portion 26 of the headliner 24 is described in detail along cross-sectional line 2—2 of FIG. 1. Vehicle body 28 that includes outer sheet metal 30 and inner sheet metal 32 provides structural support to this region of the vehicle. Outer sheet metal 30 also provides an aesthetic appearance to the exterior of the vehicle. It should be appreciated, although not specifically shown in the drawings of the preferred embodiment of the present invention, that inner sheet metal 32 and outer sheet metal 30 are welded together to form a cross-sectional area 34 that provides the structural support to this area of the vehicle. Inner sheet metal 32 includes various apertures and/or attachment points for numerous articles that can be coupled thereto.

Airbag module 36 comprises an air bag 38, energy absorption bracket 40, and an encapsulation 42. The bracket 40 is preferably made of steel rollform and is designed to absorb energy. The air bag 38 is preferably a side air bag that is deployed with less force that a frontal airbag, like those found in steering wheels and instrument panels. The bracket 40 extends longitudinally with the air bag 38. The bracket includes a generally planar portion 44, an upper downstanding leg 46, and a lower downstanding leg 48 that form a hat cross section. Lower downstanding leg 48 includes a flange 49 that extends from its distal end 50 in a direction substantially parallel to the generally planar portion 44. The upper downstanding leg 46 includes a mounting plate 52 extending from its distal end 54 in a direction also substantially parallel to the generally planar portion 44. As the mounting plate 52 and flange 49 are placed in contact with the inner sheet metal 32, a space 56 is formed bounded by the inner sheet metal 32, generally planar portion 44, lower downstanding leg 48, and upper downstanding leg 46.

Flange 49 is adapted to be placed into a recess 60 formed by a projection 62 from the inner sheet metal 32. When placed therein, downward (arrow 64) and lateral (arrow 66) movement of the flange 49 is restricted. Mounting plate 52 includes a bore 68 formed therethrough that lines up with an aperture 70 in the inner sheet metal 32 when flange 49 is inserted into recess 60. A bolt 72 is provided which is inserted through both the bore 68 and aperture 70 to ensure a coupled arrangement between the mounting plate 52 and inner sheet metal 32. It should be appreciated that a plurality of bores and apertures may be provided along the longitudinal length of the air bag module 36 and that projection 62 need not be formed continuously in the longitudinal direction, one or several localized projections 62 would be sufficient. It should further be appreciated that longitudinal locating elements may be added to ensure accurate placement of the air bag module 36, these longitudinal locating elements could be in the form of slots, pins, or a variety of other structures.

The air bag 38 and portions of the energy absorption bracket 40 are covered with an encapsulation 42, preferably made from some type of polymer. The encapsulation 42 ensures contact between the air bag 38 and the generally planar portion 44. The encapsulation 42 also extends along the downstanding legs 46, 48 and covers both the front side 80 and back side 82 of both the mounting plate 52 and flange 49. Covering the back side 82 of the mounting plate 52 and flange 49 with encapsulation 42 acts to prevent any possible vibration or noise between the bracket 40 and the inner sheet metal 32. Encapsulation 42 also includes a slit or a notch 84 formed on the laterally inward and lower corner of the air bag 38. As the air bag 38 is deployed, it breaks the encapsulation 42 at notch 84 and deploys downward 64 therefrom as shown in phantom in FIG. 2. As the air bag 38 is deployed, the header portion 26 of the headliner 24 moves laterally inboard from the force of the air bag 38 effectively allowing air bag 38 to extend down window 22. During deployment of the air bag 38, the energy absorbing bracket 40 maintains its structural integrity. The preferred construction of bracket 40 is 1040 steel having a thickness of 0.8 mm in the shape described previously.

Figure 3:
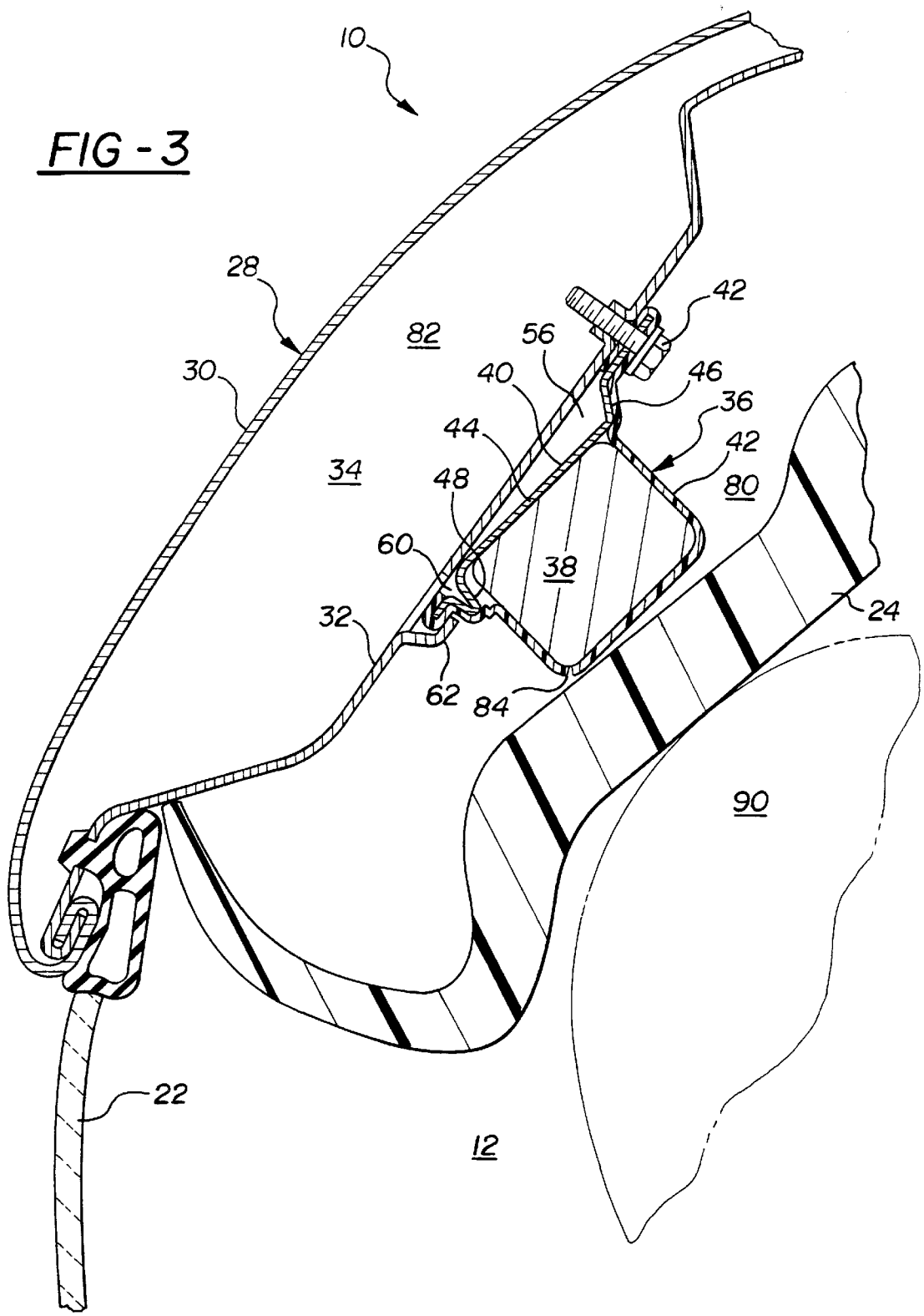
FIG. 3 is a cross-sectional view of the preferred embodiment of the present invention along the line 2—2 of FIG. 1, showing the energy absorbing bracket after being struck by an object from the interior of the vehicle.

Now in reference FIG. 3, the air bag module 36 after being struck by an object traveling from the interior 12 of the vehicle 10 is illustrated. The object 90 first encounters the headliner 24, the headliner then imparts force on the air bag module 36. The energy absorbing bracket 40 with its unique design deforms in a manner shown in FIG. 3 thereby absorbing energy. The bracket 40 deforms and collapses into space 56. The actual deformation that occurs depends on the object and the angle of impact, but essentially, the downstanding legs 46, 48 bend while the generally planar portion 44 encroaches on space 56.

Figure 4:
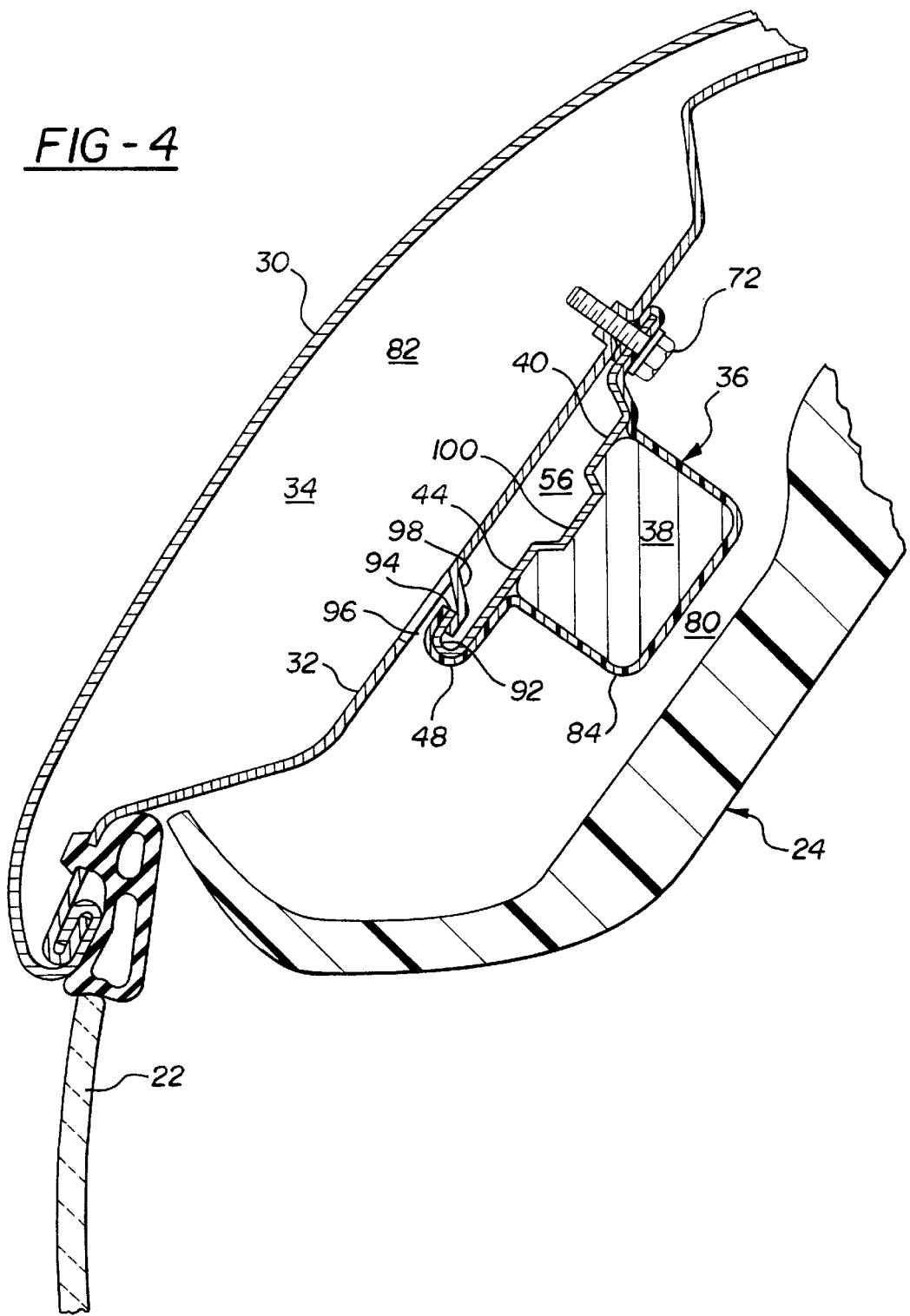
FIG. 4 is a cross-sectional view of an alternate embodiment of the present invention shown along the line 2—2 of FIG. 1.

An alternate embodiment of the present invention is shown in FIG. 4. The energy absorbing bracket 40 includes a lower downstanding leg 48 in the shape of a half pipe 92, the free end 94 of which is inserted into a recess 96 formed by a projection 98. This insertion limits upward and lateral movement of the air bag module 36. The alternate embodiments also includes a raised platform 100 formed within the generally planar portion 44 to aid in the energy absorption characteristics of the bracket. Although the alternate embodiment has some modifications, the energy absorbing bracket 40 does deform and collapse into space 56 thereby absorbing energy, just as in the preferred embodiment.

The foregoing description constitutes the preferred embodiments devised by the inventors for practicing the invention. It is apparent, however, that the invention is susceptible to modification, variation and change that will be obvious to those skilled in the art. Inasmuch as the foregoing description is intended to enable one skilled in the pertinent art to practice the invention, it should not be construed to be limited thereby but should be construed to include such aforementioned obvious variations and be limited only by the proper scope or fair meaning of the accompanying claims.

What is claimed is:

1. An air bag module comprising:

an air bag;

a bracket having a generally planar portion, a first downstanding leg and a second downstanding leg, said generally planar portion being adjacent to said air bag, said first and second downstanding legs extending from said generally planar portion at opposing sides thereof;

a flange extending from said first downstanding leg;

a mounting plate extending from said second downstanding leg, said mounting plate having a bore; and an encapsulation substantially covering said air bag and said energy absorption bracket, said encapsulation having a notch formed therein to aid in the deployment of said air bag.

2. The air bag module as set forth in claim 1, wherein said generally planar portion includes a raised platform formed therein to increase the energy absorption characteristics thereof.

3. An air bag module for a motor vehicle having a vehicle body and a window defining the exterior thereof, said vehicle body includes inner sheet metal and an outer sheet metal that are coupled together to form a cross sectional area therebetween, and said air bag module comprising:

an air bag;

an energy absorption bracket having a generally planar portion in substantial contact with said air bag, said energy absorption bracket also includes a first and second downstanding leg extending from opposing sides of said generally planar portion, said first downstanding leg having a flange extending therefrom and said second downstanding leg having a mounting plate extending therefrom, said mounting plate includes a bore formed therethrough to cooperate with an aperture formed in the inner sheet metal of the vehicle body;

a projection formed with the inner sheet metal creating a recess therewith adapted for reception of said flange;

a coupling member adapted to be received through said bore of said mounting plate and said aperture of the inner sheet metal and couple said mounting plate to the inner sheet metal;

an encapsulation substantially covering said air bag and said energy absorption bracket, said encapsulation having a notch formed therein to aid in the deployment of said air bag; and said generally planar portion, said first downstanding leg, said second downstanding leg, and the inner sheet metal form a space therebetween into which said energy absorption bracket collapses into during impact therewith.

* * * * *